United States Patent [19]

Little et al.

[11] Patent Number: 6,074,717
[45] Date of Patent: Jun. 13, 2000

[54] FLEXIBLE HOSE HAVING AN ALUMINUM BARRIER LAYER TO PREVENT INGESTION OF OXYGEN

[75] Inventors: Kent H. Little, Ozark; John A. Barnes, Springfield, both of Mo.

[73] Assignee: Dayco Products, Inc., Dayton, Ohio

[21] Appl. No.: 08/901,972

[22] Filed: Jul. 29, 1997

[51] Int. Cl.[7] .......................... B32B 15/06; B32B 15/20; F16L 9/133; F16L 53/00
[52] U.S. Cl. .................. 428/35.7; 138/133; 138/143; 156/187; 156/244.13; 428/35.8; 428/35.9; 428/36.91; 428/36.8; 428/461; 428/462
[58] Field of Search .................. 428/35.9, 35.7, 428/35.8, 461, 462, 36.91, 36.8; 156/140, 187, 188, 244.13; 138/131, 133, 138, 143

[56] References Cited

U.S. PATENT DOCUMENTS

| | | | |
|---|---|---|---|
| 4,559,973 | 12/1985 | Hane et al. ........................... | 138/138 |
| 4,633,912 | 1/1987 | Pilkington et al. ...................... | 138/132 |
| 4,758,455 | 7/1988 | Campbell et al. ........................ | 428/36 |
| 4,779,673 | 10/1988 | Chiles et al. .............................. | 165/45 |
| 5,182,147 | 1/1993 | Davis ..................................... | 4238/34.4 |
| 5,271,977 | 12/1993 | Yoshikawa et al. .................... | 428/35.9 |
| 5,398,729 | 3/1995 | Spurgat .................................... | 138/133 |
| 5,488,975 | 2/1996 | Chiles et al. ............................ | 138/125 |

Primary Examiner—Ellis Robinson
Assistant Examiner—Sandra M. Nolan
Attorney, Agent, or Firm—Joseph V. Tassone

[57] ABSTRACT

A flexible hose for use in heating systems has an aluminum barrier layer for preventing ingestion of oxygen. The aluminum barrier layer is securely bonded between two adhesion tubes which are vulcanized in place against the aluminum. Vulcanization is performed in the presence of peroxide. Principal active ingredients of the adhesion tubes are ethylene propylene diene polymethylene and polybutadiene-maleic anhydride adduct resin.

9 Claims, 1 Drawing Sheet

FLEXIBLE HOSE HAVING AN ALUMINUM BARRIER LAYER TO PREVENT INGESTION OF OXYGEN

BACKGROUND OF THE INVENTION

This invention relates to the field of flexible hoses and more particularly to flexible hoses used for circulation of fluids in radiant heating systems in homes and businesses. Typical prior art hoses for such applications are disclosed, for example, in Chiles et al. U.S. Pat. No. 4,779,673 and in Chiles et al. U.S. Pat. No. 5,488,975.

Often times such hoses supply water or other heating fluid to heat exchangers located in floors, ceilings, roofs and concrete or asphalt slabs. The hoses may be embedded in the surfaces to be heated, and it is desirable that they be flexible for ease of installation. A significant problem with such hoses is that they are subject to gas infiltration and exfiltration. Oxygen is particularly troublesome, because it is easily ingested from the outside environment. Once oxygen has gained entry to such a heating system, it deteriorates the hoses and corrodes the pumping system.

Chiles '975 discloses a flexible heating system hose having an oxygen barrier layer in the form of a thin plastic film such as ethylene vinyl alcohol. Alternatively, the patent suggests the use of an aluminum barrier layer. Both of these barriers have problems. Oxygen is able to penetrate all known plastic films, at least to some small degree. Aluminum is substantially impermeable to oxygen, but it does not bond well against other materials. Consequently prior art hoses having aluminum barrier layers tend to delaminate under stress.

A number of other prior art patents disclose flexible hoses incorporating metallic layers of one type or another. Such disclosures appear, for example, in Hane et al. U.S. Pat. No. 4,559,973, Campbell et al. U.S. Pat. No. 4,758,455, Davis U.S. Pat. No. 5,182,147, Yoshikawa et al. U.S. Pat. No. 5,271,977 and Spurgett U.S. Pat. No. 5,398,729. None of these prior art references teach a flexible hose having an aluminum barrier bonded therein with sufficient adhesion to avoid delamination over a long period of time in a heating system environment. Typically such prior art hoses are used for fuel and vapor transmission and are constructed by coating the metal strip on both sides with an adhesive which may, for example, be an adhesive made from a copolymer of ethylene and a monomer having a reactive carboxyl group, as taught in Campbell et al.

It is therefore seen that there is a need for a flexible hose incorporating an aluminum barrier layer, and able to resist delamination in a heating system environment.

SUMMARY OF THE INVENTION

This invention provides a flexible hose having an aluminum barrier layer sandwiched between two vulcanized elastomeric adhesion tubes. These adhesion tubes are securely bonded to the aluminum barrier layer by heat and pressure during assembly of the hose. The arrangement resists delamination and is substantially impermeable to oxygen.

The adhesion tubes comprise at least about 20 percent by weight of ethylene propylene diene polymethylene and from about 2 to 9 percent by weight of polybutadiene-maleic anhydride adduct resin. The formulation also includes about 2–8 percent by weight of active peroxide as a critical curing agent. The peroxide cure is performed in a conventional manner at a temperature of about 325° F. The cure unexpectedly produces a strong bond between the aluminum and the adhesion tubes. Only a peroxide cure has been found to produce such results. Suitable conventional black and non-black filler ingredients, and paraffinic or naphthenic plasticizers may be added to the mixture, as desired.

It is therefore an object of the invention to provide an improved flexible hose for heating system applications.

It is another object of the invention to provide a flexible hose having a securely bonded oxygen barrier layer.

Other objects and advantages of the invention will be apparent from the following description, the accompanying drawings and the appended claims.

DETAILED DESCRIPTION OF THE PREFERRED EMBODIMENT

Figure 1:
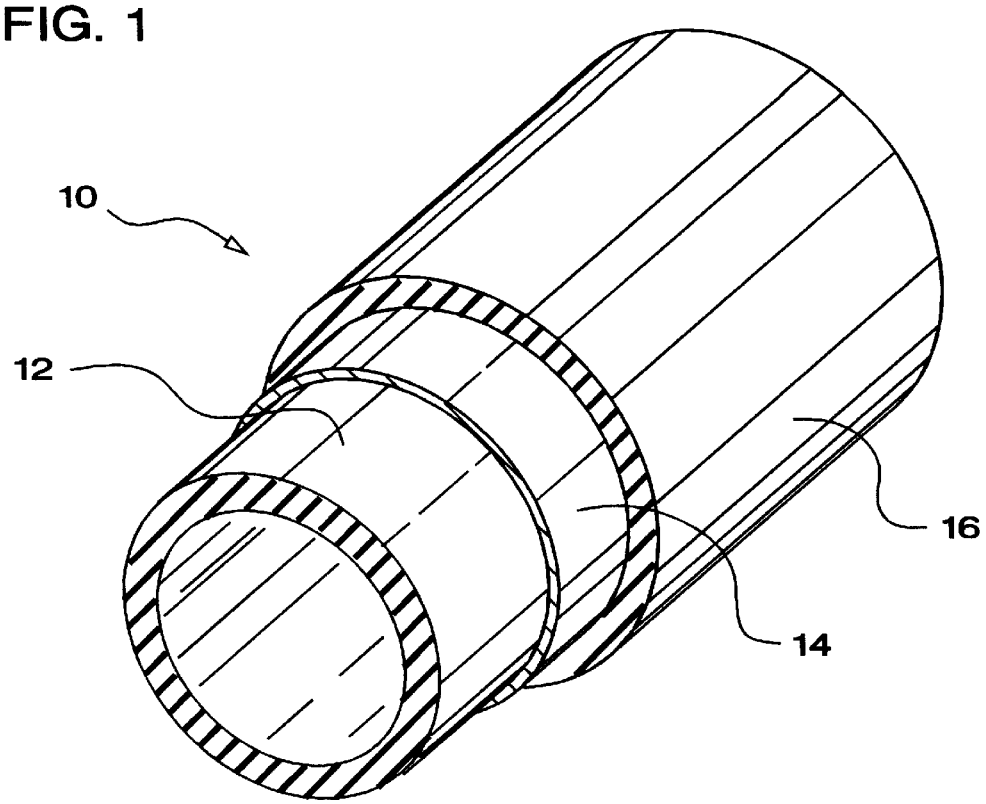
FIG. 1 is a perspective view of the invention in its simplest form comprising only an aluminum barrier layer sandwiched between two adhesion tubes.

A simple flexible hose made in accordance with this invention is illustrated in FIG. 1 as indicated by the reference numeral 10. Hose 10 comprises an aluminum barrier layer 14 sandwiched between an interiorly disposed first adhesion tube 12 and an exteriorly disposed second adhesion tube 16. Adhesion tubes 12,16 are formed from a plastic mass which is vulcanized in place against barrier layer 14.

The plastic mass is formulated from a mixture comprising at least about 20 percent by weight of ethylene propylene diene polymethylene (EPDM) and from about 2 to 9 percent by weight of polybutadiene-maleic anhydride adduct resin. These ranges are based upon adhesion testing of structures formulated from mixtures having as low as 29% by weight of EPDM, polybutadiene-maleic anhydride adduct resin in amounts as low as 4% by weight and as high as 7.3% by weight and peroxide in amounts as low as 1.3% by weight and as high as 3.9% by weight.

The mixture should incorporate from about 7 to 35 percent by weight of paraffinic oil, naphthenic hydrocarbon or other suitable plasticizer, and preferably also a copolymer of polyolefin elastomer in an amount less than about 7 percent by weight, as well as chlorosulfanated polyethylene in an amount less than about 4% by weight. These ranges have been verified by adhesion tests on structures formulated from mixtures comprising paraffinic oil in amounts as low as 13% by weight and as high as 18% by weight, a copolymer of polyolefin elastomer in an amount as high as 4 percent by weight, and chlorosulfonated polyethylene in an amount as high as 2% by weight. Finally, as is well known, 1 to 2% by weight of zinc oxide and up to 1.5 percent by weight of stearic acid should be added for satisfactory vulcanization.

Filler materials may be added to the mixture, as desired to obtain well known rubber tube properties, typically in a range from about 17 to 80% by weight. Satisfactory adhesion has been demonstrated for tubes formulated from mixtures having a filler content as low as 36% and as high as 43%.

Table I presents the preferred formulation for a compound which may be converted into adhesion tubes such as tubes 12, 16 The preferred formulation uses a combination of low diene EPDM and normal diene EPDM. These ingredients are combined with polyolefin ethylene-octene copolymer and chlorosulfonated polyethylene, which are collectively referred to as "rubber". The total composition comprises 100 parts rubber. The table presents the specific gravity of each ingredient, the percentage by weight and also the number of parts per hundred parts rubber (PHR)

TABLE I

| Ingredient | SpGr. | PHR | Wt. % |
|---|---|---|---|
| low diene hexa EPDM | 0.87 | 70.00 | 24.10 |
| EPDM | 0.88 | 15.00 | 5.16 |
| polyolefin ethylene-octene copolymer | 0.91 | 10.00 | 3.44 |
| chlorosulfonated polyethylene | 1.17 | 5.00 | 1.72 |
| carbon black | 1.80 | 80.00 | 27.54 |
| calcium carbonate | 2.71 | 40.00 | 13.77 |
| paraffinic oil | 0.89 | 45.00 | 15.49 |
| zinc oxide | 5.60 | 4.00 | 1.38 |
| stearic acid | 0.84 | 1.54 | 0.52 |
| 50% DBPH peroxide solution | 1.50 | 7.00 | 2.41 |
| polybutadiene-maleic anhydride adduct resin | 1.21 | 13.00 | 4.48 |

The above ingredients are mixed at a temperature in a range between about 210° F. and 250° F. which is high enough to promote plastic flow but too low for curing. The resulting plastic mass is extruded to produce a first adhesion tube such as tube 12. Tube 12 is then wrapped by a layer of aluminum foil which may be between about 0.0005 and 0.003 inches thick. This may be accomplished by helical wrapping or by tensioned radial curling. That produces the barrier layer 14 which is not yet bonded to tube 12.

After tube 12 has been extruded and wrapped with aluminum foil, a second adhesion tube 16 is formed about and in surface-to-surface contact with barrier layer 14. Tube 16 is fabricated from a plastic mass as described above, and may be produced by a single step extrusion process. Alternatively, tube 16 may be formed by extruding the plastic mass into a sheet or a strip and then wrapping the sheet or strip about barrier layer 14. This produces the assembly 10 of FIG. 1. Assembly 10 is then cured in an autoclave for about 35 minutes at a temperature in a range between about 320° F. and 330° F. This results in a surprisingly good bond between elastomeric tubes 12 and 16 and the barrier layer 14 which is sandwiched therebetween. It has been confirmed that the adhesion is related to the use of peroxide in the cure.

A series of tests have shown that good bonds cannot be obtained when sulfur is used as the curing agent. Whereas structures made in accordance with this invention were found in some cases to withstand delamination stresses in excess of 68 p.s.i., similar structures, cured in the presence of sulfur, generally delaminated at stresses of less than 1 p.s.i. Typical test results for structures cured in the presence of peroxide are presented in Table III. Table II identifies the ingredients referred to in Table III.

TABLE II

| Code | Ingredient |
|---|---|
| A | low diene EPDM |
| B | saturated ethylene-octene copolymer |
| C | EPDM |
| D | chlorosulfonated polyethylene |
| E | carbon black |
| F | calcium carbonate |
| G | paraffinic oil |
| H | zinc oxide |
| I | stearic acid |
| J | A.A bis T. Butylperoxy 40% solution |
| K | dicumyl peroxide, 60% solution |

TABLE II-continued

| Code | Ingredient |
|---|---|
| L | DBPH peroxide 50% solution |
| M | polybutadiene-maleic anhydride adduct resin, 70% DLC |

TABLE III

| Ingredient | Amount (PHR) | | | | | | | | |
|---|---|---|---|---|---|---|---|---|---|
| A | 55.0 | 55.0 | 40.0 | 55.0 | 70.0 | 70.0 | 70.0 | 40.0 | 40.0 |
| B | 10.0 | 10.0 | 10.0 | 10.0 | 10.0 | 10.0 | 10.0 | 10.0 | 10.0 |
| C | 30.0 | 30.0 | 45.0 | 30.0 | 15.0 | 15.0 | 15.0 | 45.0 | 45.0 |
| D | 5.0 | 5.0 | 5.0 | 5.0 | 5.0 | 5.0 | 5.0 | 5.0 | 5.0 |
| E | 80.0 | 75.0 | 70.0 | 70.0 | 75.0 | 80.0 | 70.0 | 75.0 | 80.0 |
| F | 40.0 | 38.0 | 36.0 | 36.0 | 38.0 | 40.0 | 36.0 | 38.0 | 40.0 |
| G | 44.0 | 42.0 | 40.0 | 40.0 | 42.0 | 44.0 | 40.0 | 42.0 | 44.0 |
| H | 4.0 | 4.0 | 4.0 | 4.0 | 4.0 | 4.0 | 4.0 | 4.0 | 4.0 |
| I | 1.5 | 1.5 | 1.5 | 1.5 | 1.5 | 1.5 | 1.5 | 1.5 | 1.5 |
| J | 10.0 | 0.0 | 7.5 | 0.0 | 5.0 | 0.0 | 0.0 | 0.0 | 0.0 |
| K | 0.0 | 0.0 | 0.0 | 3.3 | 0.0 | 5.0 | 0.0 | 6.7 | 0.0 |
| L | 0.0 | 6.5 | 0.0 | 0.0 | 0.0 | 0.0 | 8.7 | 0.0 | 4.35 |
| M | 20.0 | 20.0 | 20.0 | 20.0 | 20.0 | 20.0 | 20.0 | 20.0 | 20.0 |
| Adhesion p.s.i | 50.0 | 29.0 | 60.0 | 29.0 | 34.0 | 45.0 | 56.0 | 68.2 | 2.8 |

Figure 2:
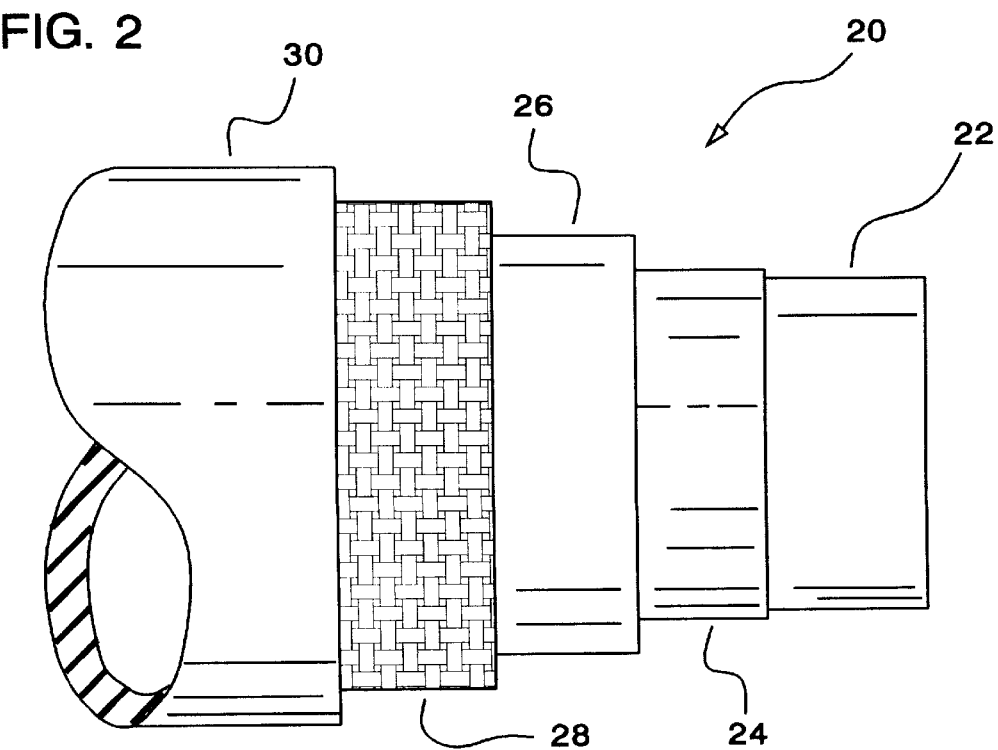
FIG. 2 is a plan view of a cut away plan view of a heating system hose embodying the present invention.

FIG. 2 illustrates a flexible heating system hose 20, made in accordance with this invention. The hose comprises an interiorly disposed first adhesion tube 22, an aluminum barrier layer 24 bonded exteriorly against first adhesion tube 22 and a second adhesion tube 26 bonded exteriorly against aluminum barrier layer 24. Tubes 22, 26 and barrier layer 24 correspond to tubes 12, 16 and barrier layer 14 of FIG. 1 and are fabricated in a similar manner. Hose 20 also has a reinforcement layer 28 bonded exteriorly against adhesion tube 26 and a cover 30 adhesively secured exteriorly against reinforcement layer 28.

Reinforcement layer 28 and cover 30 may be of conventional construction. Thus reinforcement layer 28 may be fabricated from rayon, polyester, polyvinyl acetate, wire, aramid or other suitable material. Cover 30 may be produced from any of numerous thermosetting elastomeric compounds such as natural rubber, styrene butadiene, polychloroprene, acrylonitrile butadiene, chlorosulfonated monomer, chlorinated polyethylene or EPM.

While the forms of apparatus herein described and the method of making them constitute preferred embodiments of this invention, it is to be understood that the invention is not limited to these precise forms of apparatus or method, and that changes may be made therein without departing from the scope of the invention which is defined in the appended claims.

What is claimed is:

1. A hose comprising: a first tube, an aluminum foil bonded exteriorly about said first tube and a second tube bonded exteriorly about said aluminum foil; said first tube and said second tube each comprising at least about 20 percent by weight of EPDM rubber and from about 2 to 9 percent by weight of polybutadiene-maleic anhydride adduct resin, said first tube and said second tube having been bonded to the surface of said aluminum foil by thermal curing in the presence of peroxide in the amount of about 0.6 percent to 2.8 percent by weight of tube material.

2. A hose according to claim 1 further comprising a reinforcement layer bonded exteriorly about said second tube and a cover bonded exteriorly about said reinforcement layer.

3. A hose according to claim 2 wherein said first tube and said second tube each comprise about 7 percent to 35 percent by weight of paraffinic oil.

4. A hose according to claim 3 wherein said first tube and said second tube each comprise an ethylene-octene copolymer in an amount less than about 7 percent by weight.

5. A hose according to claim 4 wherein said first tube and said second tube each comprise chlorosulfonated polyethylene in an amount of less than about 4 percent by weight.

6. A hose according to claim 5 wherein said first tube and said second tube each comprise about 1 percent to 2 percent by weight of zinc oxide.

7. A hose according to claim 6 wherein said first tube and said second tube each comprise stearic acid in an amount of less than about 1.5 percent by weight.

8. A hose according to claim 7 wherein said first tube and said second tube each comprise about 17 percent to 80 percent by weight of filler material.

9. A method of making a flexible hose comprising the steps of:

(1) preparing a mixture comprising at least about 20 percent by weight of EPDM, about 2 to 9 percent by weight of polybutadiene-maleic anhydride adduct resin, about 0.6 to 2.8 percent by weight of peroxide, about 7 percent to 35 percent by weight of paraffinic oil, a copolymer of polyolefin elastomer in an amount less than about 7 percent by weight, chlorosulfonated polyethylene in an amount of less than about 4 percent by weight, about 1 percent to 2 percent by weight of zinc oxide, stearic acid in an amount of less than about 1.5 percent by weight and about 17 percent to 80 percent by weight of filler material;

(2) creating a plastic mass by mixing said mixture at a temperature high enough to obtain a plastic flow but below the curing temperature thereof;

(3) forming a first tube from said plastic mass;

(4) wrapping a layer of aluminum foil about said first tube and in surface contact therewith;

(5) forming a second tube from said plastic mass, said second tube being formed exteriorly about said layer of aluminum foil and in surface contact therewith; and (6) thermally curing said first tube and said second tube while maintaining surface contact thereof against said layer of aluminum foil.

* * * * *